S. S. UNDERWOOD.
BRAKE BEAM HANGER.
APPLICATION FILED FEB. 21, 1910.
966,142.
Patented Aug. 2, 1910.
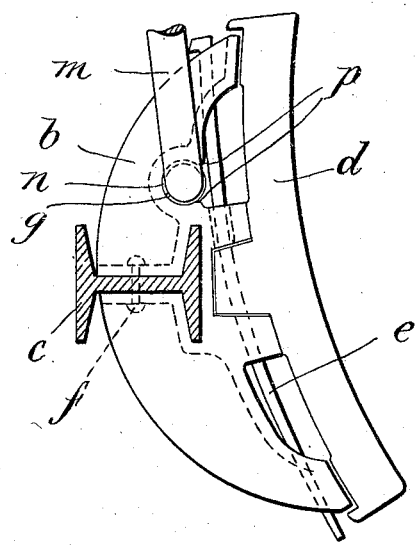
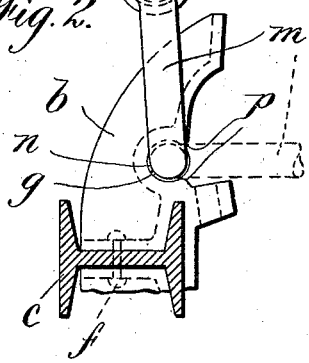
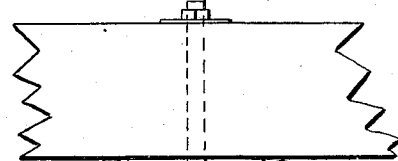
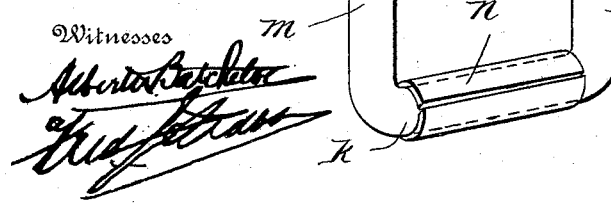
THE NORRIS PETERS CO., WASHINGTON, D. C.

UNITED STATES PATENT OFFICE.

SIDNEY SMITH UNDERWOOD, OF MONTREAL, QUEBEC, CANADA.

BRAKE-BEAM HANGER.

966,142.  Specification of Letters Patent.  Patented Aug. 2, 1910.

Application filed February 21, 1910. Serial No. 545,095.

*To all whom it may concern:*

Be it known that I, SIDNEY SMITH UNDERWOOD, of the city of Montreal, Province of Quebec, Canada, have invented certain new and useful Improvements in Brake-Beam Hangers; and I do hereby declare that the following is a full, clear, and exact description of the same.

The invention has for its object to prevent the brake head and with it the beam from becoming disengaged from the hanger in the event of the brake shoe key being removed; and it may be said briefly to consist of the particular construction of the hanger hereinafter described and pointed out in the claims.

For full comprehension, however, of my invention reference must be had to the accompanying drawings, forming a part of this specification, in which similar reference characters indicate the same parts, and wherein—

Figure 1 is a side elevation of a brake head with brake shoe in place, the brake beam being shown in transverse section, and the whole supported by my improved hanger; Fig. 2 is an enlarged detail side elevation of the upper portion of the brake head and the end of my improved hanger engaged therewith; Fig. 3 is a face view of the parts illustrated in Fig. 2; and Fig. 4 is a detail perspective view of my improved hanger removed.

The brake head $b$, beam $c$, shoe $d$, and key $e$ for detachably fastening the shoe to the head are of usual construction and well known in the art, there being, of course, a pair of heads and shoes on each beam, and a pair of hangers suspending the brake heads and through them the shoes and beam. The brake heads are fixed to the brake beam by rivets $f$ or otherwise, and each is formed with a transverse socket $g$ having a longitudinal mouth the lips $p$ whereof reduce its width to less than the diameter of the socket $g$ in which the horizontal portion $h$ of its hanger has heretofore been held by the key. This arrangement is defective for the reason that unauthorized persons are enabled to disengage the brake heads, shoes and beam from the hanger by simply removing the keys, and the same disengagement would take place at one or both ends if either or both keys should happen to be displaced by breakage. In order to overcome this defect I so construct the hanging means that the heads will be self held against displacement from the hanger proper while the latter is attached to the truck and readily either set in place in the socket of the head or freed therefrom when the hanger is disconnected from the truck. This embodiment of my invention consists of a one piece hanger of U-form the horizontal portion $h$ whereof and the legs $m$ connected thereto are substantially equal in diameter to the space between the lips of the mouth of the socket $g$, to permit the said horizontal portion to be passed endwise into the socket when the hanger is turned to the position shown in dotted lines in Fig. 2.

The member which locks the brake head and hanger together and is locked itself against displacement by the said parts consists of a bushing $n$ preferably in the form of a split sleeve.

To assemble the brake head and hanger the bushing is first placed upon the hanger and, thus furnished, the hanger is inserted endwise into the socket. The effect is that the hanger is free to rotate in the bushing and held by the bushing against lateral displacement and it is prevented from longitudinal displacement by the legs straddling the upper portion of the head; while the bushing itself is locked in the socket by the hanger.

With this construction and arrangement the brake heads and beams are positively locked against displacement from the hanger while the latter is connected to the truck, and worn or broken brake shoes may be replaced with new ones, or the shoes stripped from the heads by unauthorized persons, without danger of displacement of the heads and beam.

I do not herein claim the locking device $n$ broadly as it is claimed in an application filed by me under No. 545,093 on Feb. 21, 1910.

What I claim is as follows:—

1. The combination with a brake head having a transverse socket with a longitudinal mouth of less measurement transversely to the socket than the diameter of the said socket, of a hanger the bearing portion whereof is of less diameter than the socket, and a bushing in the form of a split sleeve inclosing the said bearing portion of the hanger and serving to prevent lateral displacement of the hanger from the socket.

2. The combination with a brake head having a transverse socket with a longitudinal mouth of less measurement transversely to the socket than the diameter of the said socket, of a hanger the bearing portion whereof is of less diameter than the socket, and a bushing inclosing the said bearing portion of the hanger and serving to prevent lateral displacement of the hanger from the socket.

In testimony whereof, I have signed my name to this specification, in the presence of two subscribing witnesses.

SIDNEY SMITH UNDERWOOD.

Witnesses:
  WILLIAM P. McFEAT,
  FRED J. SEARS.